Patented July 2, 1940

2,206,277

UNITED STATES PATENT OFFICE 2,206,277

REFRACTORY MATERIAL FOR USE IN BASIC PROCESS SIDEROTHERMIC FURNACES

Giovanni Battista Crespi, Ceriana, Imperia, Italy

No Drawing. Application August 18, 1938, Serial No. 225,614. In Italy August 27, 1937

3 Claims. (Cl. 266—43)

REISSUED
MAR 24 1942

It is known that the laboratory of a Martin furnace for the fusion of steels is formed of the following parts: namely, hearth, right angle steps, burners and arch.

A variety of refractory materials have been used in the construction of these various parts. For the hearth, dolomite has been employed mixed with tar or with slag. In the former case the material is prepared cold, whilst in the second case, the production is effected within the furnace heated to its highest temperature.

The right angle steps are constructed of silica bricks, a part (the bottom wall) sometimes being constructed with the aid of tarred dolomite.

The bodies of the burners are always formed of masonry work using silica or magnesia bricks.

The arch is always formed of a basis of silica bricks.

The laboratory of electric furnaces consists of a hearth, walls and arch only.

The hearth is always formed of tar and dolomite rammed while the furnace is cold.

The walls are formed of silica bricks or are a structure of tar and dolomite.

The arch is always formed of a basis of silica bricks.

The construction of these linings consumes much time, and the materials (bricks of silica or magnesia) are costly and their maintenance is troublesome in view of the rapid wear. There is always the disadvantage which arises as a result of the falling off of particles of the silica bricks through the bath of material and the settling thereof upon the basic hearth.

The disadvantages above set forth are overcome by means of the present invention, since all the refractory materials which are required in the construction may be utilized cold, these materials comprising pure calcined dolomite without the admixture of agglomerates of any kind, the material being reduced to a fine grain and stamped into position cold, to produce a compact mass which will be transformed into a completely petrified body under the action of heat during the operation of the furnace. From 5 to 15% of iron may be added to the dolomite for the formation of the right angle steps and the burners.

The process for the formation of the hearth is extremely simple. Upon the plates carrying the hearth there is spread a certain quantity of dolomite of fine grain, and this is stamped or pressed in any convenient manner, as for example with the aid of stamps, to form a compact mass. For a Martin furnace of 20 T. the above described operation can be carried out by eight workmen working for 8 hours, without the employment of any mechanical aid or heat. With the employment of the materials hitherto known for this purpose in the cold process, the 8 workmen would require 48 hours, and in addition there would be required the use of a considerable quantity of tar. The hot process hitherto carried out involves still further expense as well as a considerable consumption of heat energy.

An examination of a hearth constructed in accordance with the invention indicates that even after one melt only, this hearth has the form of a petrified body in which the dolomite cannot be recognized.

The formation of the right angle steps and the burners requires somewhat more labor and the addition of a small quantity of iron and tar, but only to the extent of a layer of a few centimetres thickness, so that the cost is increased to only a negligible extent. In this case the operation is commenced by moulding a band upon an iron former of a contour corresponding to the internal shape of the lining to be formed, the band being formed of a mixture composed of dolomite with iron and a small proportion of tar. This band is made from 5 to 10 centimetres thick and about 10 centimetres high. Thereafter the remaining space to be occupied by the lining is filled with finely divided dolomite mixed with a suitable proportion of iron and the applied material is thereafter consolidated with care. This forming process is continued in this manner to produce a number of successive layers until the lining is finally produced. Thereafter the iron former is removed and is available for use in the formation of other linings. During the first melting operations the material is completely petrified.

In the construction of the mountings for the gas inlets a similar procedure is followed, but without the addition of any tar and with the aid of iron formers mounted in such a manner as to correspond exactly with the form of the inlet openings which are to be mounted and which are subsequently placed in position.

It will be obvious that the processes for the production of the hearths, the walls and the burners are very simple and do not involve either considerable manual labour or the consumption of considerable heat.

The nature and scope of the invention is clearly defined by the following six points which have regard to the various points of view to be considered.

I. Two processes are known for the production of iron and steel; the basic hearth and the acid hearth.

In the present case the invention is concerned with the formation of the hearth and the walls of the laboratory, as well as the mountings for the burners in a gas furnace.

The invention is, however, well adapted to be employed in the formation of a considerable part of the walls and of the mountings for the burners of acid hearth furnaces.

The invention further includes the application of calcined dolomite according to the process described as a substitute for the usual refractory materials having a basis of dolomite, magnesia and the like in the construction of metallurgical and the like furnaces of the kind employing high temperatures.

Up to the present calcined dolomite has been used only in the formation and the maintenance of the hearths of gas or electric furnaces for the production of iron and steel. Sometimes it has been used in the formation of the rear right angle steps of gas furnaces and the walls of electric furnaces and of basic convertors.

II. All the known processes, however, have always made use of the dolomite in a form crushed to the size of peanuts and usually separated from the powder formed during the crushing operation.

In the formation of the hearths of gas furnaces the dolomite was mixed with ground slag (functioning as a flux) and it was applied in position in the form of a succession of layers throughout the whole operation of cold-forming the hearth.

In the formation of the right angle step at the rear of gas furnaces and the hearth and the walls of electric furnaces the dolomite, similarly crushed and to which was added several per cent of slag (flux) was mixed with 8 to 10% of tar and pressed in position in the form of a succession of layers by means of pneumatic stamps, first producing a cold-formed structure.

However, in the construction of basic hearths and of all the parts bathed by the liquid steel covered by the slag, the layers of dolomite thus formed are supported upon a reinforcement of bricks of magnesia, since they do not offer a sufficient guarantee against corrosion.

III. The invention further includes a new process of employment which gives the best results and consequently widens the field of possible application, namely:

(1) The total elimination of bricks of magnesia from the construction of furnaces for the manufacture of steel;

(2) Saving of the magnesia and chromite pastes indispensable in the construction and maintenance of the laboratories of furnaces;

(3) The achievement of great and uniform compactness in the linings produced by the new processes.

Last but not least, the dolomite materials thus obtained which retain the refractory properties of pure dolomite are not subject to progressive crumbling and they are adapted, therefore, to be applied with advantage to those parts of the laboratories of furnaces which are at present built with valuable silica bricks or of other materials of very high price (Magnesite and the like).

In addition to the application of the dolomite material according to the invention to Martin-Siemens furnaces it may also be applied in the following cases:

(1) Furnaces for the production of ferro-alloys;

(2) Mixers;

(3) Thomas convertors;

(4) Induction furnaces of any frequency;

(5) Continuous cupolas and furnaces for cast iron, dolomite, cement and the like;

(6) Furnaces for the re-heating of ingots;

(7) Hearths, burners, walls and arches for all industrial furnaces.

The invention is applicable, therefore, to all cases where a long life and a rapid construction is desirable, since it offers economy both in respect of hand labor and in the absence of undesired interruptions in the operation of the furnaces.

IV. The invention consists therefore in the use of calcined dolomite ground to the fineness of rice and flour, and cold pressed by means of suitable stamps and in some cases in combination with iron or steel wire. Generally speaking no conglomerates or melting components are added. The mass thus formed acquires great compactness, so that after a short operation of the furnace it acquires great durability and the fracture of granite.

V. As a particular example, in the formation of the hearth of a furnace the dolomite is ground in a suitable mill to the fineness of rice grains and flour, and the hearth is formed by the application of successive layers pressed by means of stamps and starting from the bottom supporting plates and extending to the total required height, and without the addition of conglomerates or melting components. The compactness increases with the thickness of the hearth, but very good results are achieved even with comparatively small thicknesses.

The right angle steps are formed in an analogous manner, but close to the auxiliary internal former of the lining there is employed a mixture of dolomite and a small proportion of tar to form a layer of a thickness of a little more than 5 centimetres and extending for 15 centimetres above the level of the slag covering the metal bath. Even this small addition of tar may, however, be avoided if the compression of the dolomite against the internal former is effected with care. From above this level the dolomite is applied with iron or steel wire embedded therein and for the remainder of the total height; these iron wires constitute from 5 to 15% of the weight of the dolomite, always forming the internal layer against the former, and for a thickness of some centimetres using a mixture dolomite-iron-tar strongly compacted; the tar may be omitted if the compacting is effected very strongly.

In a similar manner there may be constructed the admission heads comprising the admission and departure openings for gas and air to and from the arch of the regenerators and the laboratory of the furnace.

In this case the passages for conducting the gas and air prior to their arrival at the supports for the burners are formed by providing a facing of reinforced and suitable anchored iron sheets. Within these formers are mounted tubes of a section and shape required, and a mixture of dolomite and iron wire is pressed into the interspace. The mountings for the burners are similarly constructed by an energetic stamping of a mixture of dolomite and iron against a suitable preliminarily mounted iron former.

VI. The invention is equally applicable for use in all other types of furnace where operations of this kind are conveniently employed, the methods adopted of course being varied to suit the diverse constructions required. Refractory bricks of all kinds can also be constructed in an analogous manner, such bricks being of any convenient size, and the invention may also be employed in the construction of refractory seatings and bushes, casting moulds and the like.

What I claim is:

1. A method of forming a basic lining in a hearth or on other structural parts of a furnace, which consists in applying finely ground pure calcined dolomite in cold condition in successive layers upon the inner face of the furnace to be treated, stamping said dolomite layers one after the other against said face by a suitable tool until a unified and compact lining is formed, and transforming said lining by action of heat during furnace operation into a petrified monobloc mass.

2. A method of forming a basic lining in a hearth or on other structural parts of a furnace, which consists in applying pure calcined dolomite ground to the fineness of rice and flour and in a dry and cold condition upon the inner face of the furnace to be treated, then stamping said material against said face by a suitable tool, thus forming successive layers until a unified and compact lining is formed, and transforming said lining by action of heat during furnace operation into a petrified monobloc mass.

3. A method of forming a basic lining in a hearth or on other structural parts of a furnace, which consists in applying without conglomerates or melting components pure calcined dolomite ground to the fineness of rice and flour and in a dry and cold condition upon the inner face of the furnace to be treated, then stamping said material against said face by a suitable tool and reinforcing said material by any suitable holding means, thus forming successive layers until a unified and compact lining is formed, and transforming said lining by action of heat during furnace operation into a petrified monobloc mass.

GIOVANNI BATTISTA CRESPI.